United States Patent
Britz et al.

(10) Patent No.: US 8,925,728 B2
(45) Date of Patent: Jan. 6, 2015

(54) METHOD FOR REMOVING SOLID MATTER FROM A FIBROUS MATERIAL SUSPENSION BY MEANS OF FLOTATION

(75) Inventors: Herbert Britz, Berg (DE); Delphine Delmas, Onetle Chateau (FR)

(73) Assignee: Voith Patent GmbH, Heidenheim (DE)

( * ) Notice: Subject to any disclaimer, the term of this patent is extended or adjusted under 35 U.S.C. 154(b) by 284 days.

(21) Appl. No.: 13/453,376

(22) Filed: Apr. 23, 2012

(65) Prior Publication Data

US 2013/0105366 A1 May 2, 2013

Related U.S. Application Data

(63) Continuation of application No. PCT/EP2010/060191, filed on Jul. 15, 2010.

(30) Foreign Application Priority Data

Oct. 23, 2009 (DE) .......... 10 2009 045 965

(51) Int. Cl.
*B03D 1/02* (2006.01)
*B03D 1/00* (2006.01)
*D21B 1/32* (2006.01)
*D21F 1/70* (2006.01)

(52) U.S. Cl.
CPC ....... *B03D 1/00* (2013.01); *D21B 1/327* (2013.01); *D21F 1/70* (2013.01)
USPC .......................................................... 209/164

(58) Field of Classification Search
CPC .......... B03D 1/02; B03D 1/023; B03D 1/025; B03D 1/1406; D21B 1/327
USPC ................................. 209/162–165
See application file for complete search history.

(56) References Cited

U.S. PATENT DOCUMENTS

| | | | | |
|---|---|---|---|---|
| 2,005,742 A | * | 6/1935 | Hines | 162/5 |
| 4,331,534 A | * | 5/1982 | Barnscheidt | 209/164 |
| 5,069,751 A | * | 12/1991 | Chamblee et al. | 162/5 |
| 5,804,061 A | * | 9/1998 | Hebert et al. | 209/170 |
| 6,082,549 A | * | 7/2000 | Gommel et al. | 209/164 |
| 6,413,366 B1 | * | 7/2002 | Kemper | 162/60 |
| 2006/0021916 A1 | * | 2/2006 | Hess et al. | 209/164 |
| 2008/0296206 A1 | * | 12/2008 | Gabl | 209/164 |

FOREIGN PATENT DOCUMENTS

| | | |
|---|---|---|
| DE | 198 23 053 C1 | 10/1999 |
| DE | 101 25 978 C1 | 1/2003 |
| DE | 103 29 883 A1 | 1/2005 |
| EP | 1 029 975 A1 | 8/2000 |
| EP | 1 262 593 A1 | 12/2002 |
| EP | 1 416 086 A2 | 5/2004 |
| WO | 2009/077035 A1 | 6/2009 |

OTHER PUBLICATIONS

International Search Report dated Oct. 21, 2010 for International Application No. PCT/EP20101060191 (6 pages).

* cited by examiner

*Primary Examiner* — Joseph C Rodriguez
(74) *Attorney, Agent, or Firm* — Taylor IP, P.C.

(57) ABSTRACT

The invention relates to a method for removing solid matter, in particular impurities, by means of flotation from a fibrous material suspension (S), wherein the fibrous material suspension (S) is mixed with gas (L), and wherein in at least two flotation chambers (1, 2, 2', 2", 2'", 2"") flotation foam (3, 4) is formed that collects solid matter and removes it from the flotation chamber. The flotation foam (4) of at least one flotation chamber (1, 2, 2', 2", 2'", 2"") is at least partially conducted into at least one other flotation chamber (1), in particular in the flotation foam (3) formed therein. According to the method, the complexity can be reduced, even with high requirements regarding effect and yield.

14 Claims, 6 Drawing Sheets

METHOD FOR REMOVING SOLID MATTER FROM A FIBROUS MATERIAL SUSPENSION BY MEANS OF FLOTATION

CROSS REFERENCE TO RELATED APPLICATIONS

This is a continuation of PCT application No. PCT/EP2010/060191, entitled "METHOD FOR REMOVING SOLID MATTER FROM A FIBROUS MATERIAL SUSPENSION BY MEANS OF FLOTATION", filed Jul. 15, 2010, which is incorporated herein by reference.

BACKGROUND OF THE INVENTION

1. Field of the Invention

The invention relates to a method for removing solid matter method for removing solid matter from a fibrous stock suspension by way of flotation, wherein fibrous stock suspension is mixed with gas and wherein flotation foam is formed in at least two flotation chambers and collects solid matter and removes it from flotation chamber and wherein moreover the fibrous stock suspension which has been ridded of the solid matter is discharged as through-flow from respective flotation chamber.

2. Description of the Related Art

A foam or floating sludge is formed through flotation which contains and removes matter to be eliminated. A typical application for such methods is the processing of a suspension obtained from recovered printed paper, wherein the printing ink particles are already detached from the fibers so that they can be removed through flotation. A fiber stock consistency (volume of fibers relative to the overall volume) of between 0.5% and 2%, preferably between 0.8% and 1.2%, is hereby often adjusted in the fibrous stock suspension. The flotation process described here exploits the differences between paper fiber stock and solids which are to be removed, in particular undesirable impurities in such a way that the fibrous material based on its rather hydrophilic character remains in the fibrous stock suspension, whereas the aforementioned impurity particles are hydrophobic and therefore migrate into the foam together with the air bubbles. Therefore, not all solid matters are removed through flotation; however, fibers are separated from contaminants. As a rule, the often used term "flotation deinking" is not only used to remove printing ink particles, but also more generally for the flotation of fines from the fibrous stock suspension. Besides the aforementioned printing inks, additional contaminants include in particular stickies, fine synthetic particles and possibly also resins. Controlled removal through flotation of mineral filler materials ("ash") may also be one of the objectives of the method.

The current state of the art in regard to flotation methods for fibrous stock suspensions is already very advanced. Solutions are available which are definitely suitable for removal of solid particles through flotation in the desired method and volume. However, good flotation results are obtained with a relatively high expenditure, especially in regard to equipment, operating resources and energy. The problem is in meeting two requirements, namely on the one hand complete removal of all materials which are to be rejected, as a rule removal of the impurities, and on the other hand avoiding losses, namely the unintended removal of materials which are to be utilized for the product to be produced at a later stage. In the practice of flotation these two objectives can be met equally well only with complex procedures.

In order to achieve optimum separation of floatable materials as well as only a very small loss, multi-stage equipment can be used. The fibrous stock suspension hereby flows usually consecutively through several flotation chambers or flotation cells assigned to one flotation stage until the desired material removal is achieved in the through-flow, or in other words in the accepted stock. Since the overflow, namely the flotation foam, which is formed in this flotation stage still contains a considerable amount of for example paper fibers it is directed as inflow into a further stage. Normally one refers to a first and second flotation stage, or also to primary or secondary flotation. The through-flow, namely the accepted stock of the second flotation stage can again be added to the incoming flow of the first flotation stage. There are also cases in which the through-flow of the second stage is mixed to the through-flow, namely the accepted stock of the first stage. The flotation foam produced in the second stage can then be disposed of or if it still contains too many fibers can be directed to a third stage. Flotation chambers or cells for the second flotation stage are usually designed similar or identical to those for the first stage, however there are substantially fewer in number. Typical installations have five or six flotation cells in the primary stage and one or two in the secondary stage.

DE 101 25 978 C1 describes a two-stage flotation unit whereby partial flows are drawn off and re-added at another stage in the unit. In particular, flotation foam is returned into the fibrous stock suspension of flotation cells located upstream.

It is the objective of the current invention, and what is needed in the art is, to reduce the expenditure associated with implementation of the method without occurrence of losses in regard to the separation efficiency.

SUMMARY OF THE INVENTION

This objective is met by, and the present invention provides, a method for removing solid matter from a fibrous stock suspension by way of flotation, wherein fibrous stock suspension is mixed with gas and wherein flotation foam is formed in at least two flotation chambers and collects solid matter and removes it from flotation chamber and wherein moreover the fibrous stock suspension which has been ridded of the solid matter is discharged as through-flow from respective flotation chamber, characterized in that flotation foam of at least one flotation chamber is fed at least partially into another flotation chamber.

With the new method a foam layer having considerably enlarged foam volume is formed in at least one selected flotation chamber. Hereby it can be accepted that due to the process, the additionally supplied flotation foam still contains residual fibers. These can drain off between the gas bubbles into the fibrous stock suspension below (foam drainage) together with the sinking water.

Moreover, the stability of the foam layer is improved through the method, since additional liquid is added to it which in turn permits a higher foam layer. The foam drainage is facilitated by a relatively moist high foam layer and thereby the fiber loss is decisively reduced.

The new method essentially has the advantage that there can be fewer flotation cells, in particular if the fibrous stock suspension to be floated is first directed into the foam receiving flotation chamber. The flotation foam formed therein normally has the highest level of contamination. It is supplemented with the less contaminated added flotation foam, whereby said flotation foam does not encumber the actual flotation process in this flotation chamber. The flotation process is basically only a statistical process (flotation-probability). Other than would be the case in a fresh flotation in an additional stage, it is advantageous in the inventive method that the recirculated foam is directed into the strongly gaseous foam layer interspersed with globoidal bubbles of the first flotation chamber.

The flotation foam to be recirculated can advantageously be deaerated so that it can be transported with a foam pump. This de-airing can however be less (partial de-airing) than when the flotation foam is to be pumped together with a fibrous stock suspension.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
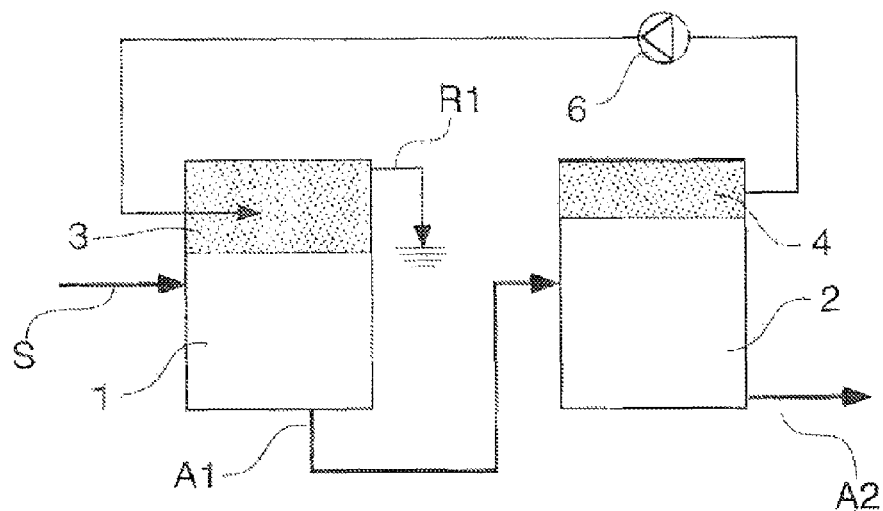
FIG. 1 shows a simple process diagram explaining the invention.

FIG. 1 shows a simple diagram with a flotation chamber 1, into which fibrous stock suspension S to be floated is fed. The amalgamation with gas is hereby not illustrated. Through-flow A1 of this chamber is directed into an additional flotation chamber 2. In both of the flotation chambers 1 and 2 flotation foam 3 or respectively 4 is formed. Flotation foam 4 of second flotation chamber 2 is drawn off as overflow and is directed into flotation foam 3 of first flotation chamber 1 aided by a partially degassing foam pump 6. Through-flow A2 of second flotation chamber 2 is either the accepted stock of the flotation line, or it is floated further. The overflow of the first flotation chamber is disposed of as reject R1.

Figure 2:
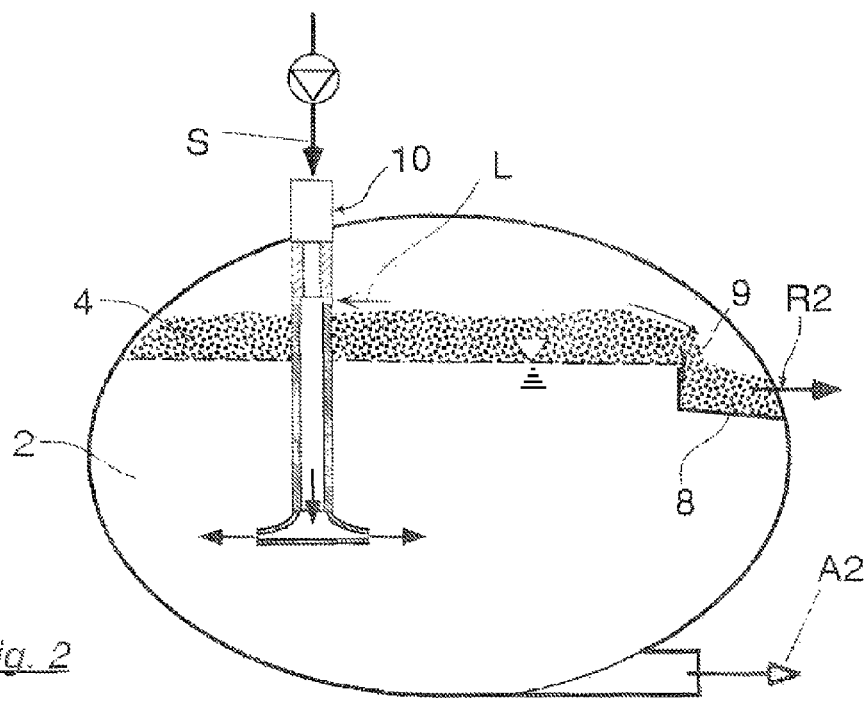
FIG. 2 shows a common flotation cell for implementation of the inventive method.
Figure 3:
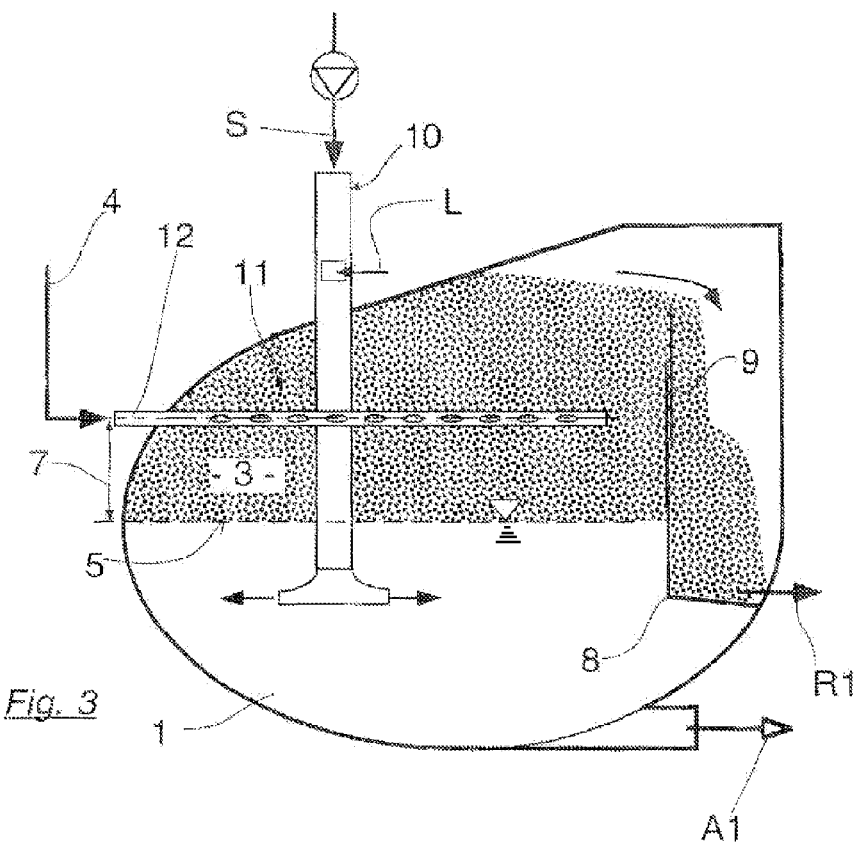
FIG. 3 shows a special flotation cell with foam infeed for implementation of the inventive method.

Since the task of first flotation chamber 1 (FIG. 1) is somewhat different to that of second flotation chamber 2, it can be useful to design the flotation cells differently for these different purposes (in this context see for example FIGS. 2 and 3).

Normally more than two flotation chambers will be used (in this context see FIGS. 4, 5, 6 and 7) in order to use the method on an industrial scale.

FIG. 2 illustrates the section through a flotation cell incorporating flotation chamber 2 having an oval cross section which is a shape that has proven exceptionally advantageous. Fibrous stock suspension S is pumped into mixing device 10 and is intensively mixed with gas L, generally air, thus forming gas bubbles. Mixing device 10 is advantageously arranged off-center in flotation chamber 2 and dips into the aerated fibrous stock suspension S'. Gas L is drawn up by means of injector action and is mixed with fibrous stock suspension S'. Gas L can be drawn off directly from the flotation cell above flotation foam 4. Rising flotation foam 4 absorbs the solids to be floated, in particular impurities such as printing ink particles, synthetic particles or resins and runs off over the preferably adjustable foam barrier 9 into a foam trough 8. It thereby forms the overflow of this cell and is discharged as reject R2. The through-flow, namely accepts A2, is drawn off in the lower part of flotation chamber 2.

Figure 8:
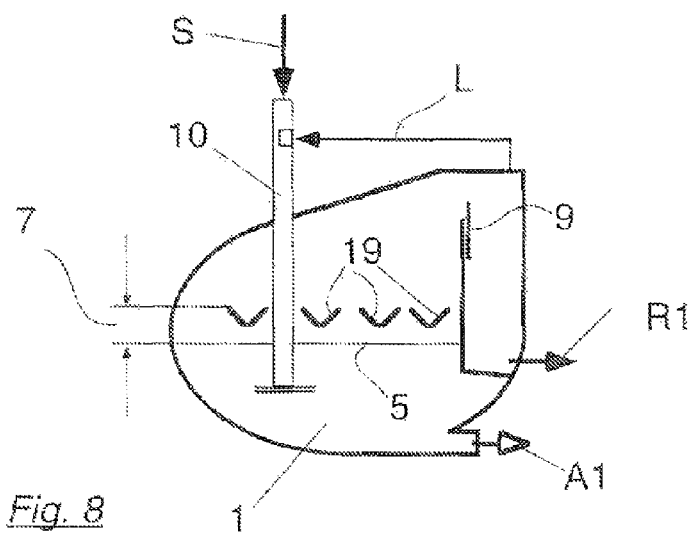
FIGS. 8-13 each show an additional possible flotation cell with foam inflow.
Figure 9:
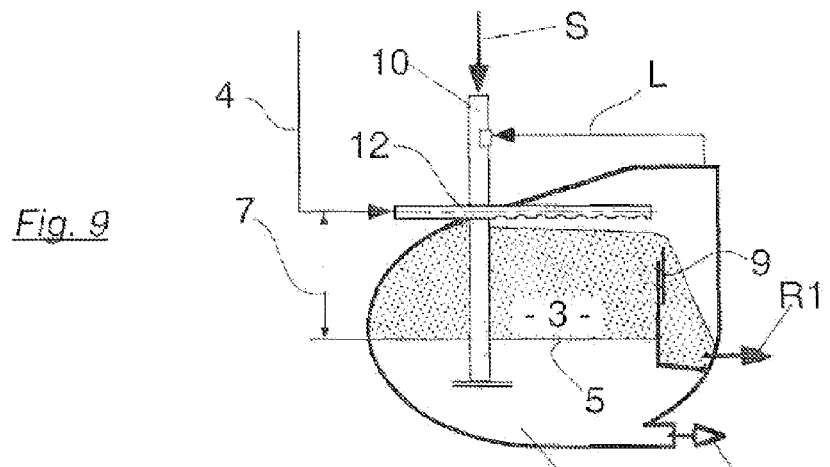
Figure 10:
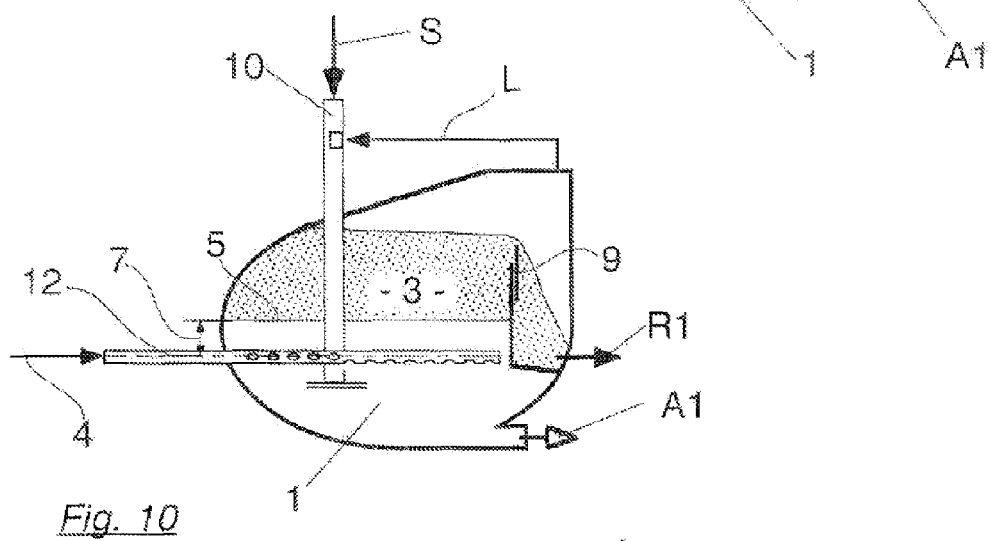
Figure 11:
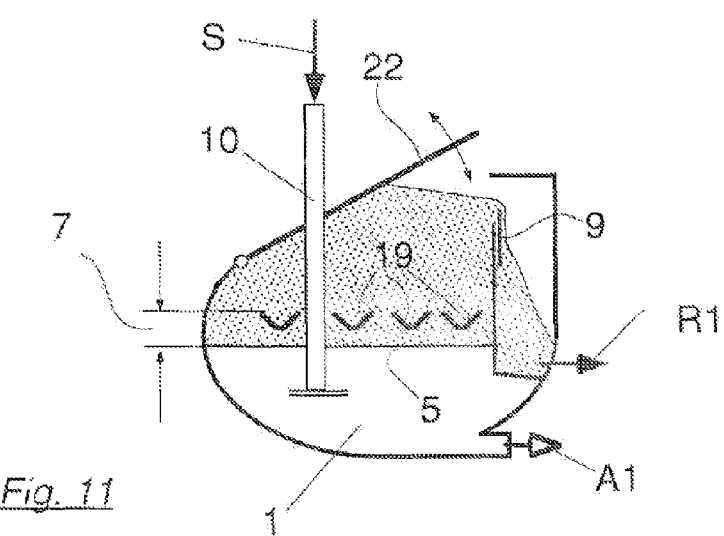

FIG. 3 illustrates a flotation cell especially designed for the inventive method. Above the interface between suspension S and foam namely above suspension level 5, it is provided with a foam collection chamber 11 which has a relatively large volume. The inlets for the incoming flotation foam 4 which originates in another flotation chamber and which is mixed with the here rising flotation foam 3 discharge into this foam collection chamber 11. For feeding of flotation foam 4 a perforated pipe 12 is indicated as an example, however other possibilities for example troughs 19 which are open at the top (see FIG. 8) are also conceivable. Generally it is to be attempted that flotation foam 4 is distributed across a surface area whereby this surface area can be positioned approximately at right angle or slightly obliquely to the direction of ascent of flotation foam 3, however it does not necessarily have to extend across entire flotation chamber 1. For example a horizontal distribution can occur which includes at least 30% of the horizontal cross sectional surface of flotation chamber 1 in the infeed region. Flotation foam 4 is fed into flotation foam 3 in a region which in this example has a positive distance 7 from suspension level 5, measured in direction of ascent of flotation foam 3. Such a distance 7 may for example be between 100 mm and 1000 mm. In certain circumstances infeed can even occur above the ascending flotation foam 3 (see FIG. 9). There are however also other applications whereby the infeed of flotation foam 4 is performed below suspension level 5, in other words at a negative distance 7 (see FIG. 10). Foam collection chamber 11 is advantageously partially limited by foam guide surfaces which back up the rising flotation foam slightly and guide it in transverse direction to foam trough 8. The foam drainage is hereby further improved. The foam guide surfaces can be adjustable through a pivoting or movable wall 22 in order to influence or respectively control the foam flows (see FIG. 11). By adjusting foam barrier 9 the foam height and thereby in particular foam dewatering can be influenced.

Figure 12:
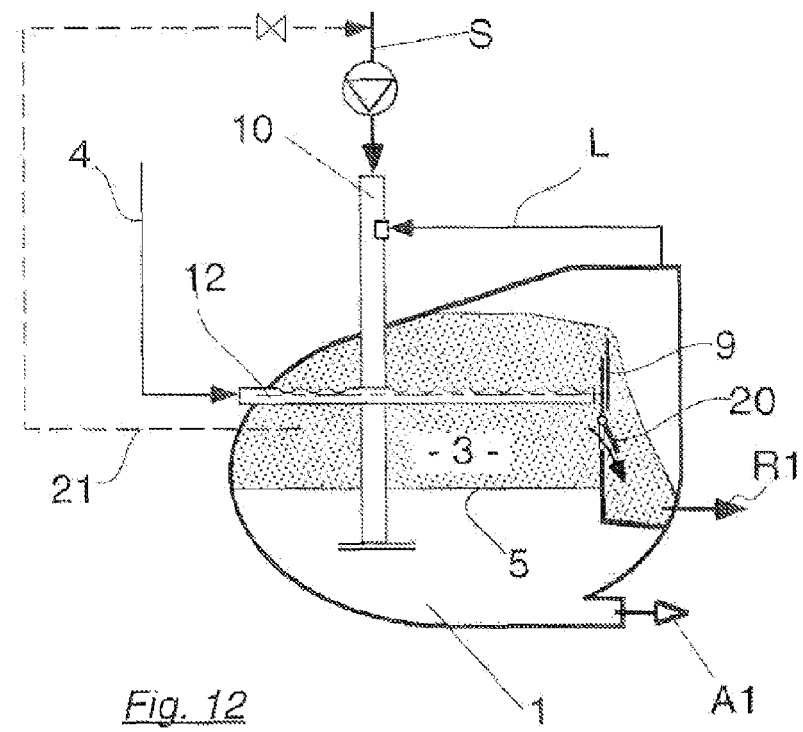

It can be advantageous to not completely intermix flotation foam 3 formed in flotation chamber 1 with fed in flotation foam 4. The non-intermixed part can then for example be directed into reject 1 via an adjustable foam valve 20 (see FIG. 12) or can be fed directly into flotation foam 4 which is to be fed in. (arrow 21 in FIG. 12).

Equipment related solutions are already available which serve to feed the suspension to be floated into the already developed flotation foam, as known for example from EP 1 029 975 A1 and DE 198 23 053 C1. Such or similar equipment may also be suitable for the new method.

Figure 4:
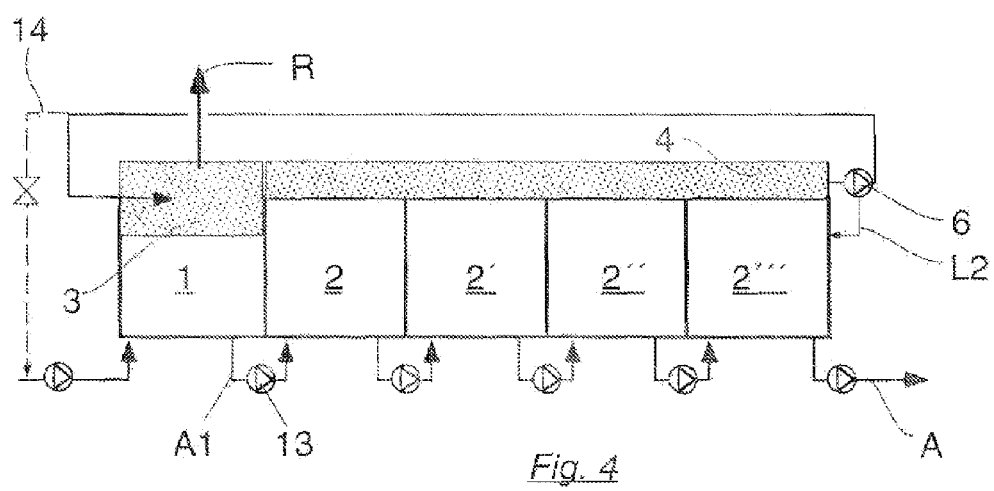
FIG. 4 shows a process diagram with a total of 5 flotation cells.
Figure 5:
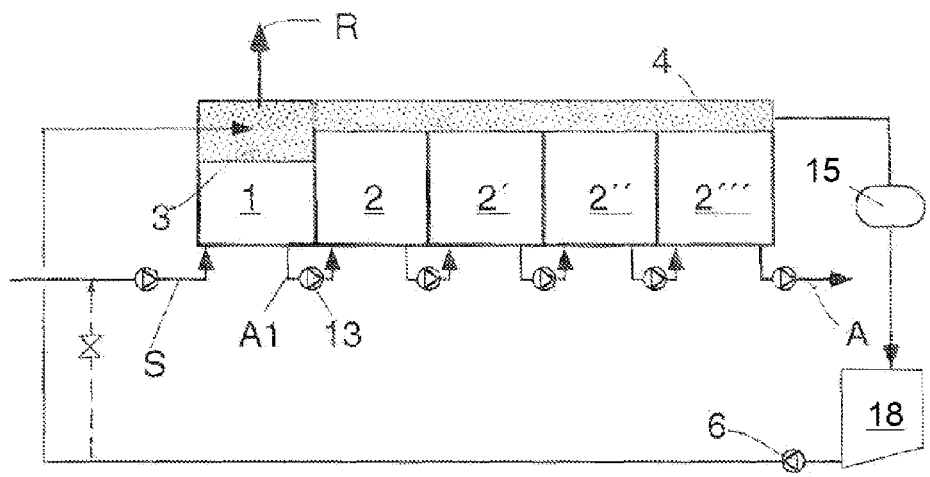
FIG. 5 shows a variation of the process diagram shown in FIG. 4.

The inventive flotation line can, as illustrated in FIG. 4, comprise a first flotation cell with flotation chamber 1, as well as four additional flotation cells each with a flotation chamber 2, 2', 2" or 2"". Fibrous stock S to be floated is pumped into first flotation chamber 1 and is treated with gas by a mixing device which is not illustrated so that flotation foam 3 is formed. Through-flow A1 of this cell is transported into the next flotation chamber 2 by means of a stock pump 13 (centrifugal pump) where again initially treatment with gas and then flotation occurs. These procedures are repeated in flotation chambers 2', 2" and 2'". The last through-flow is the accepted stock A of the line. The overflows of flotation chambers 2, 2', 2" and 2'" are collected in a common foam trough and are fed as flotation foam 4 into flotation foam 3 of first flotation chamber 1. For control purposes for example, part of flotation foam 4 can be diverted off and can in particular be added to the inflow to first flotation chamber 1, which is indicated here by a dashed line 14 with control valve. The overflow occurring in first flotation chamber 1 is disposed of as reject R. Foam pump 6 may be in the embodiment of a degassing pump—in this instance with gas return L2 into flotation chamber 2'". According to FIG. 5 in place of a degassing pump a foam depressor 15 which is known in principle and which serves to rupture the gas bubbles can be provided, as well as an adjacent foam tank 16.

Figure 6:
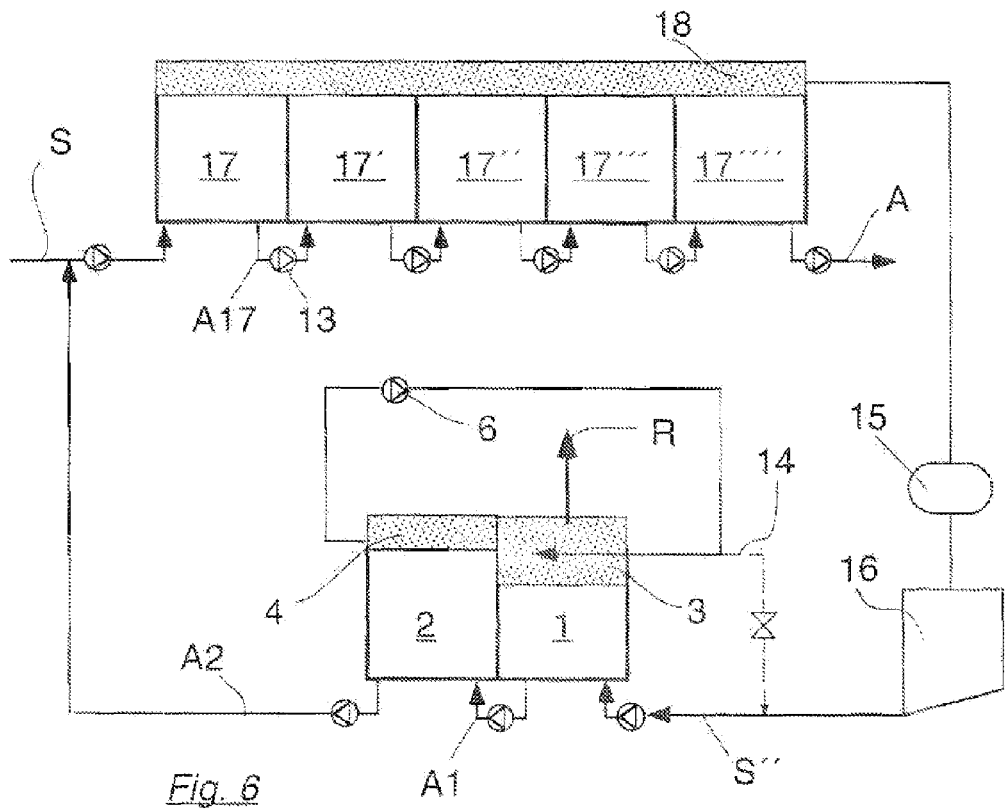
FIG. 6 shows a possible application of the method in a multi-stage flotation unit.

Even if flotation is to occur in several stages, the invention may be used advantageously. To this end FIG. 6 illustrates a flotation line comprising five flotation chambers 17, 17', 17", 17'" and 17"" arranged in tandem and operated according to standard which serve as the first stage and whereby fibrous stock suspension S to be floated is pumped into first flotation chamber 17. Flotation foam 18 of the first stage is conducted as fibrous stock suspension S" into the inflow of a flotation chamber 1 allocated to the second stage—in this instance after a foam depressor 15 and a foam tank 16. The second stage includes a second flotation chamber 2 which is supplied with through-flow A1 of first flotation chamber 1 and in which flotation foam 4 is formed. Flotation foam 4 is fed into flotation foam 3 via foam pump 6. Through-flow A2 of flotation chamber 2 is directed into the inflow to the first stage and the overflow from flotation chamber 1 can be disposed of as reject R.

Figure 7:
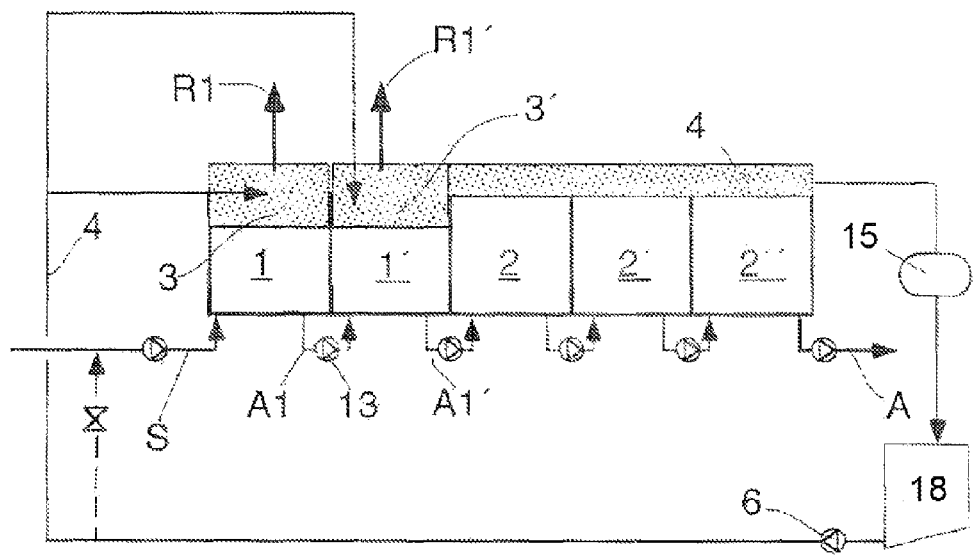
FIG. 7 shows a variation wherein two foam receiving flotation chambers are used.

An additional arrangement of the method is illustrated in FIG. 7. In this case two, in particular the first two flotation chambers 1 and 1' are operated such that flotation foam 3 or 3' forming respectively therein is supplied with flotation foam which is again added in, whereby the example of direct addition is illustrated here. Other options can be seen in FIGS. 8 and 9. Overflows R1 and R1' can be disposed of. The two flotation chambers 1 and 1' are arranged in tandem, meaning that through-flow A1 of first flotation chamber 1 is pumped into the next flotation chamber 1' and is again gassed by means of a mixing device. Arranged downstream are flotation chambers 2, 2' and 2" into which no flotation foam is added.

Figure 13:
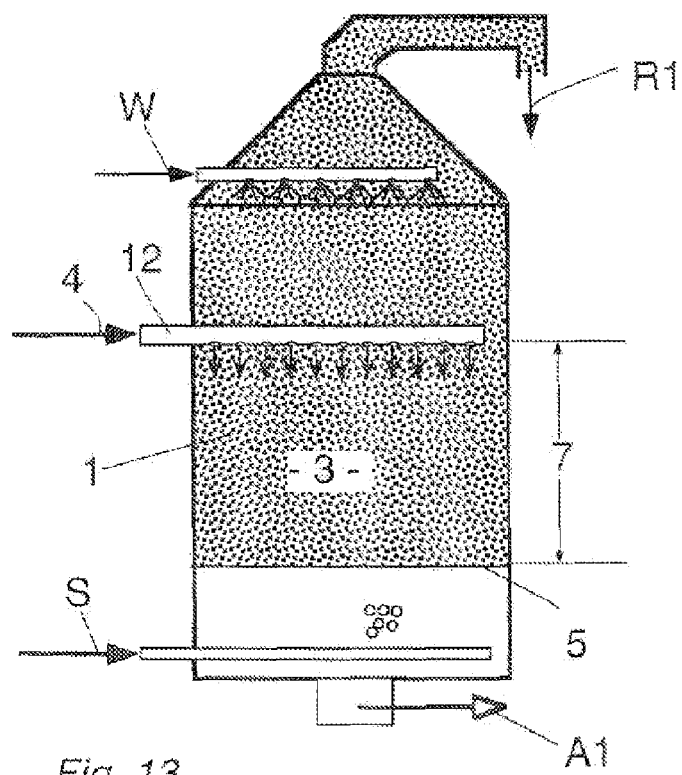

FIG. 13 shows an apparatus for column flotation whereby the flotation foam is removed from the housing through a slight overpressure. This apparatus includes a flotation chamber 1. With this too the invention can be realized if flotation foam 4 produced in another flotation chamber is fed into the forming flotation foam 3, for example via at least one perforated pipe 12 (or also open troughs, see FIG. 8). As an option, water W may be added from the top in order to stabilize the flotation foam.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for removing solid matter from a fibrous stock suspension by way of flotation, said method comprising the steps of:
    mixing the fibrous stock suspension with a gas;
    forming a flotation foam respectively in at least two flotation chambers, said flotation foam respectively collecting the solid matter and removing the solid matter from said at least two flotation chambers;
    discharging the fibrous stock suspension, which has been freed of the solid matter, as a through-flow from respectively said at least two flotation chambers; and
    introducing said flotation foam of at least one of said at least two flotation chambers at least partially into another of said at least two flotation chambers, wherein the flotation foam to be introduced into the other flotation chamber is introduced in a region which is located between a suspension level and an upper limit of a combined flotation foam.

2. The method according to claim 1, wherein said flotation foam is to be introduced is fed into said flotation foam of said other flotation chamber in a region at a distance from the suspension level measured in a direction of ascent of said flotation foam of said other flotation chamber of between 0 and 200 mm.

3. The method according to claim 1, wherein said flotation foam to be introduced is fed into said flotation foam of said other flotation chamber in a region at a distance from the suspension level measured in a direction of ascent of said flotation foam of said other flotation chamber of at least 100 mm.

4. The method according to claim 1, wherein said flotation foam to be introduced is partially deaerated and is then introduced into said flotation foam of said other flotation chamber.

5. The method according to claim 1, wherein said flotation foam to be introduced is introduced into said flotation foam of said other flotation chamber without interposition of a collecting chamber.

6. The method according to claim 1, wherein a height of said combined flotation foam in said flotation chamber receiving said flotation foam of said other flotation chamber is adjusted in order to influence a foam dewatering.

7. The method according to claim 1, wherein a number of said flotation chambers, to which no said flotation foam to be introduced is supplied, is at least three times greater than the number of said flotation chamber and a plurality of said flotation chambers receiving said flotation foam which is to be introduced.

8. The method according to claim 1, wherein a number of said flotation chambers, to which no said flotation foam to be introduced is supplied, is at least four times greater than the number of said flotation chamber and a plurality of said flotation chambers receiving said flotation foam which is to be introduced.

9. The method according to claim 1, wherein, in said flotation chamber which receives said flotation foam which is to be introduced, said combined flotation foam is guided through at least one foam guide surface.

10. The method according to claim 9, wherein a position of one of said foam guide surface and a plurality of said foam guide surface is adjustable.

11. The method according to claim 1, wherein only some of said flotation foam that has accumulated in said flotation chambers, to which no flotation foam to be introduced is supplied, is introduced into said flotation chamber which receives said flotation foam which is to be introduced.

12. The method according to claim 1, wherein only some of said flotation foam formed in said flotation chamber receiving said flotation foam to be introduced is mixed with said flotation foam to be introduced which is formed in at least one other said flotation chamber.

13. The method according to claim 1, wherein said flotation foam which is to be introduced into said flotation chamber, that receives said flotation foam to be introduced, is fed in such a manner that a horizontal distribution occurs which covers at least 30% of a horizontal cross-sectional area of said flotation chamber receiving said flotation foam which is to be introduced in an infeed region.

14. The method according to claim 1, wherein said flotation foam which is to be introduced into said flotation chamber, that receives said flotation foam to be introduced, is fed in such a manner that a horizontal distribution occurs which covers at least 50% of a horizontal cross-sectional area of said flotation chamber receiving said flotation foam which is to be introduced in an infeed region.

* * * * *